United States Patent
Berkowitz et al.

(10) Patent No.: US 8,760,996 B2
(45) Date of Patent: *Jun. 24, 2014

(54) COORDINATED FAULT PROTECTION SYSTEM

(75) Inventors: Donald S. Berkowitz, Monroe, WA (US); Michael G. Ennis, Evanston, IL (US); Michael J. Meisinger, Sr., Chicago, IL (US); James K. Niemira, Skokie, IL (US); Raymond P. O'Leary, Evanston, IL (US); Thomas J. Burns, Cincinnati, OH (US); William D. Walburg, Fort Thomas, KY (US)

(73) Assignee: S&C Electric Company, Chicago, IL (US)

( * ) Notice: Subject to any disclaimer, the term of this patent is extended or adjusted under 35 U.S.C. 154(b) by 366 days.

This patent is subject to a terminal disclaimer.

(21) Appl. No.: 13/038,142

(22) Filed: Mar. 1, 2011

(65) Prior Publication Data

US 2012/0120790 A1    May 17, 2012

Related U.S. Application Data

(63) Continuation of application No. 11/656,642, filed on Jan. 23, 2007, now Pat. No. 7,916,627.

(60) Provisional application No. 60/765,544, filed on Feb. 6, 2006.

(51) Int. Cl.
*H04J 1/16* (2006.01)

(52) U.S. Cl.
USPC .......................................... 370/216; 370/242

(58) Field of Classification Search
USPC ................................................. 370/216, 242
See application file for complete search history.

(56) References Cited

U.S. PATENT DOCUMENTS

| | | | |
|---|---|---|---|
| 2002/0085327 A1* | 7/2002 | Kim et al. ........................ | 361/42 |
| 2003/0216876 A1* | 11/2003 | Premerlani et al. .............. | 702/58 |
| 2003/0225481 A1* | 12/2003 | Sealing et al. ................. | 700/286 |
| 2005/0259571 A1* | 11/2005 | Battou ........................... | 370/217 |
| 2006/0126608 A1* | 6/2006 | Pereira et al. ................. | 370/360 |
| 2006/0166794 A1* | 7/2006 | Brown ........................... | 482/104 |
| 2006/0176631 A1* | 8/2006 | Cannon .......................... | 361/80 |
| 2007/0285857 A1* | 12/2007 | Berkowitz et al. ............... | 361/64 |
| 2008/0219186 A1* | 9/2008 | Bell et al. ....................... | 370/254 |
| 2008/0219239 A1* | 9/2008 | Bell et al. ......................... | 370/351 |
| 2008/0234838 A1* | 9/2008 | Ghanekar et al. ............... | 700/22 |
| 2010/0118451 A1* | 5/2010 | Scott et al. ..................... | 361/47 |
| 2010/0161151 A1* | 6/2010 | Yang et al. ..................... | 700/297 |

* cited by examiner

*Primary Examiner* — Andrew Lee

(57) ABSTRACT

A power distribution protection system and method uses communications to coordinate operation of fault protection devices. Communications may be prioritized wherein messages of a lower priority are held or discarded in favor of messages of a higher priority, for example, messages indicating a fault condition. The devices may use multiple channel access schemes in accordance with a priority of a message to be communicated.

27 Claims, 6 Drawing Sheets

COORDINATED FAULT PROTECTION SYSTEM

CROSS-REFERENCE TO RELATED APPLICATIONS

This patent is a continuation of U.S. patent application Ser. No. 11/656,642 filed Jan. 23, 2007, the disclosure of which is hereby expressly incorporated herein for all purposes.

TECHNICAL FIELD

This patent relates to power distribution systems, and more particularly, this patent relates to systems and methods providing coordinated fault protection and power distribution system recovery using communications.

BACKGROUND

Power distribution systems may include technology to provide circuit protection, fault isolation, circuit reconfiguration (typically for restoration of service to stranded, load-side customers) and system return-to-normal functions. For example, the power distribution system may include fault protection devices including: source protection devices, such as circuit breakers, load protection devices, such as fuses, and fault protection devices, such as fault interrupters, sectionalizers, reclosers and the like, that segment a distribution line and permit fault isolation. While various strategies may be employed to manage the power distribution system to maintain service and to protect the power distribution system, typically the fault protection devices should operate in a coordinated manner to optimize performance of the power distribution system and to minimize the scope and duration of service interruptions. That is, to isolate a fault at the fault protection device nearest the fault to protect the source and to preserve service to loads between the source and the fault protection device.

At the same time, the power distribution system should be manageable, recoverable and operable at a high level of performance with reduced burden. These goals become difficult to obtain as the distribution system becomes heavily populated with fault protection devices.

Wide area communication systems have been employed for several decades as a means to enhance the automation of electric power distribution systems to provide management and system recovery. These systems are responsible for controlling the distribution of power from sources/substations out over medium voltage feeders/distribution lines to consumers and are typically radio based due to the high cost of providing fiber or other fixed communication media over a wide geographic area. An example of commercial communication products include the Utilinet radio, sold by Schlumberger, Inc. Most of these products are used in conjunction with SCADA systems, or other low to medium-speed communication applications such as the IntelliTEAM® circuit reconfiguration system, available from S&C Electric Company, Chicago, Ill.

Circuit/equipment protection systems, on the other hand, require high speed (low latency) and high reliability communications. Some of these systems are or can also be radio-based. An example of such a system includes the HRDS system available from S&C Electric Company. These systems utilize dedicated point-to-point links and dedicated communication channels for each pair of communicating devices. A company called Freewave Communications offers a radio-based off-the-shelf product for use in conjunction with the Schweitzer Engineering Laboratories, Inc. (SEL) mirrored-bits communication protocol. With these two technologies, digital status points can be conveyed between two interconnected distribution automation control devices over radio-based communication infrastructure.

There are a number of drawbacks to these radio-based, dedicated point-to-point systems:

1) Each point-to-point link requires dedicated infrastructure including dedicated channels and often dedicated radio pairs and repeaters. This makes the cost prohibitive and the installation and maintenance process cumbersome.

2) In grid-style power distribution topologies, it may take many of these point-to-point links to provide comprehensive coordination of protective devices.

3) If the communication path fails, it is difficult (and in many systems impossible) to create an alternative communication path "on-the-fly" to restore the communication between end devices.

4) The paths cannot be used as general purpose, routable communication paths to exchange other communication traffic because this could compromise the low-latency message delivery requirements of protection applications.

Mesh-topology communication systems or communication systems based upon the Internet's Ad-Hoc Routing methodology and spread-spectrum radios address several of the foregoing concerns, but not all. Bandwidth and/or latency-related issues remain, particularly when the systems are allowed to carry other competing communication traffic.

The apparent bandwidth solution is to simply increase the BAUD rate of the radios relative to the volume of communication traffic until adequate latency performance can be assured. However, a limitation is rapidly reached, as the effective range of all of the radio devices decreases with increasing BAUD rate. Increasing the number of intermediate devices in this situation only worsens the latency performance and increases maintenance concerns. Adding additional channels can also reduce the latency of the communication traffic, but this requires additional hardware, which may prove cost prohibitive.

What is needed is a communication system that can respond quickly and efficiently to prioritized or emergency communication traffic. Such a system may respond to more than one priority of message traffic, and may do so without loosing lower priority traffic. A communication device in this system may also recognize the presence of prioritized or emergency traffic even if the device is not an active participant in the communication exchange, responding by reducing its own burden on the system. The communication system may also support complex interconnectivity and alternate communication paths to provide consistent, reliable high speed radio-based communication. The system should do so without requiring complex, time-consuming configuration.

BRIEF DESCRIPTION OF THE DRAWINGS

FIGS. 4a and 4b are schematic representations of a power distribution system that illustrate a communication based fault protection scheme in accordance with a herein described embodiment of the invention;

DETAILED DESCRIPTION

An exemplary power distribution system as described herein provides added flexibility and reliability while also providing enhanced coordinated operation to provide fault protection/isolation, system reconfiguration and return to normal operation. Such exemplary power distribution systems may accommodate greater densities of fault protection devices, e.g., switches, fault interrupters, sectionalizer, and the like by providing communication coordinated operation between these devices and thus offering the opportunity to reduce or limit service interruptions. In accordance with the various embodiments described herein, performance enhancement is achieved using a high speed communication scheme that may employ a single communication channel or resource.

Figure 1:
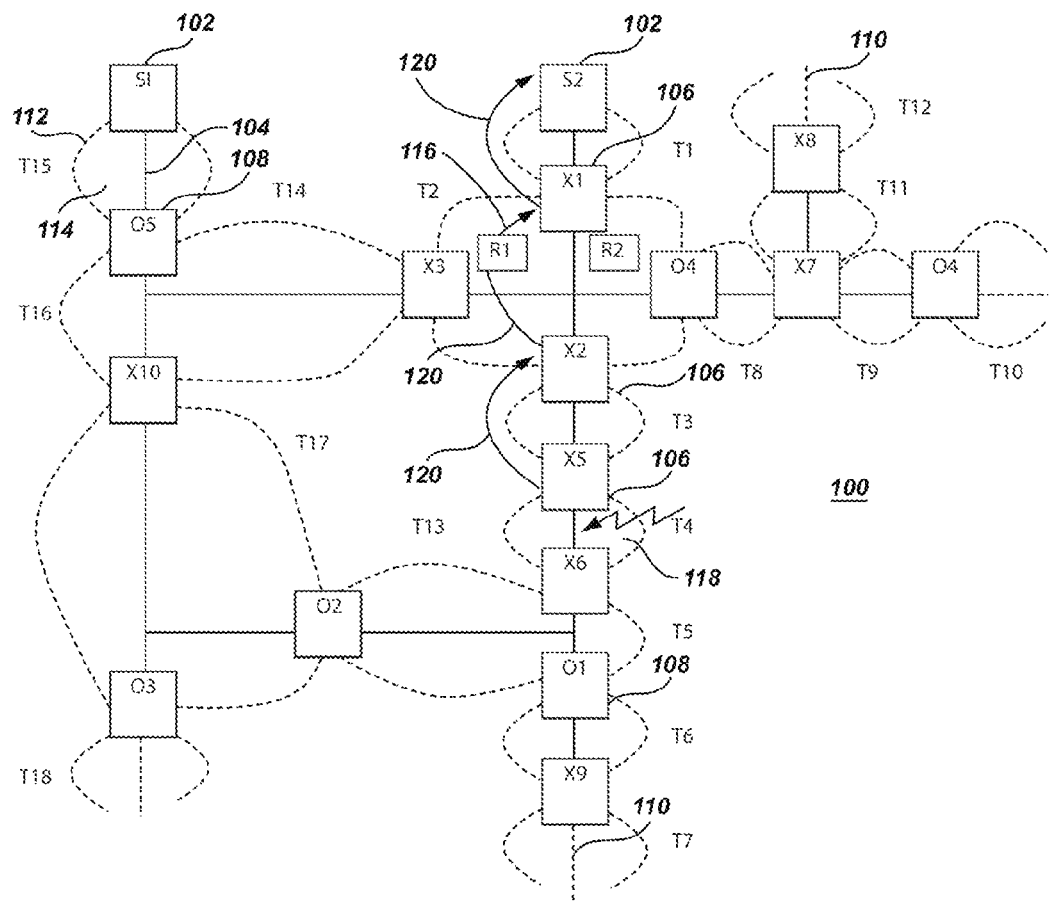
FIG. 1 is a graphic illustration of a power distribution grid incorporating communication coordinated fault isolation.

FIG. 1 illustrates an example open loop or radial electrical distribution system 100 that may incorporate the communication and coordination concepts in accordance with one or more of the herein described embodiments. It should be understood that while various communication and coordination systems, techniques and methodologies will be described in connection with the various herein described embodiments, the system components and structures, techniques and methodologies may well be interchangeable in various actual implementations. Thus, one of ordinary skill in the art will appreciate that while each element, structure, feature, technique may not be described in connection with every embodiment they are variously combinable in an implementation, and such combination is contemplated within this disclosure.

The distribution system 100 is useful for providing a description of a typical distribution structure and how such a system operates. The system 100 may incorporate one or more substations or sources of supply (S1-n) 102 for the distribution system 100. The solid straight lines 104 illustrate distribution lines or conductors that connect between the sources 102 and closed switches (X1-n) 106 and open switches (O1-n) 108. Each straight line 104 typically represents a three-phase distribution feeder which may or may not contain a fourth ground conductor depending on the type of distribution. The dashed straight lines 110 indicate connections to adjacent feeders or adjacent substations (not depicted). The curved dashed lines 112 indicate portions (or segments) 114 of the distribution system 100 bounded by switches 106/108. This description of the distribution system 100 is consistent with the architecture of the IntelliTEAM-II circuit reconfiguration system where the switches 106/108 associated with each of these segments 114 is known collectively as a "team" (T1-n). The optionally provided repeaters/routers (R1-n) 116 represent repeating radios that simply pass received messages on to other radios when direct, e.g., line-of-sight connectivity between a source and destination control cannot be obtained or other communication considerations dictate. These repeaters 116 may typically act as routing nodes, being able to intelligently receive and route messages from one communication device to another. Of further note is that communication devices directly associated with switches 106/108 may act as repeating nodes, and that in the context of the routing function, any repeater/switch can route messages without regard to the electrical configuration of the distribution system 100.

Ordinarily, the goal of protection/fault isolation schemes is to respond to a potential overcurrent or other detected abnormality to operate only the nearest fault protection device, e.g., to open the switch, fault interrupter, etc. nearest the source-side of the fault. Fault protection device, switch, fault interrupter are used generally interchangeably throughout this disclosure to refer to devices capable of interrupting a circuit responsive to a command to operate to interrupt a fault or isolate a segment of the distribution system, for example, to isolate a fault. Operating the fault protection device nearest the source-side of the fault leaves source-side switches and substation protection devices (e.g., substation circuit breakers) away from the faulted segment closed. As shown in FIG. 1, as a result of the fault 118, high, short-circuit current will flow through switches 106: X1, X2 and X5, and substation 102: S2. The devices may be programmed upon installation or initial system configuration to act in a coordinated manner to ensure only switch 106: X5 operates to isolate the fault. An example of a system and method for coordinating multiple fault protection devices, e.g., fault interrupters, is described in the commonly assigned United States Patent Application entitled "Fault Protection System and Method for an Electrical Power Distribution System" Ser. No. 60/732,475 filed Nov. 2, 2005, the disclosure of which is hereby expressly incorporated herein by reference. Alternatively, or additionally, the devices 106: X1, X2 and X5 and the substation 102: S2 may employ communication techniques providing coordinated operation.

Each of the switches 106: X1, X2 and X5 and the substation 102: S2 see and detect very rapidly (typically within ½ cycle or less) the abnormal current as a result of the fault. Upon detecting the abnormal current, each device will send a message to its source of supply within its respective team 114. In protective relaying, this message may be referred to as a "carrier start" signal, an initial signaling message, a delay message, a fault detection message and the like. The message indicates that the load-side device has detected an abnormally high current and if this condition persists (based upon any one of a variety of common overcurrent protection algorithms (such as time overcurrent trip, definite time, etc.) it will cause the device to operate its interrupter/breaker mechanism to open the circuit.

It is helpful in the context of the present disclosure to describe several design principles for the system. The devices that detect the abnormal condition send an initial signaling message when the condition is detected. The initial signaling message occurs prior to the time when the device is expected to operate to provide circuit protection/fault isolation. Since the devices that detect the abnormal condition do so at about the same time, these devices send the initial signaling message substantially "simultaneously." That is, the initial signaling message is sent by each device at the same time or within a short predetermined period of time of each other, nominally about 0-8 ms of when the abnormal condition occurs/is detected. The protection system design provides that a circuit protection/fault isolation device can delay for at least a predetermined time (nominally 100 ms but potentially for shorter or longer periods of time, as discussed herein)

before initiating its circuit protection/fault isolation operation. The effect of the initial signaling message is not to block operation of the upstream device, or to prevent its operation if conditions suggest immediate action is required to prevent device or system damage, but merely to delay its operation if appropriate. In essence, the upstream device, upon receiving the message, selects a slower response curve such that it can serve as a backup protective device in case the closest source-side fault protection device does not successfully operate. Since the device closest to the fault on its source side will not receive the initial signaling message, it can assume that it is closest to the fault and can be prepared to operate at any time after waiting for the initial delay interval subsequent to detecting the abnormal condition to pass. Alternatively, if this device is capable of recognizing or is programmed to know that there is no other load-side, closed, fault protection devices present, it need not delay in anticipation of the signaling message as it is the closest device to the fault.

As described above, receipt of the initial signaling message does no more than to delay the potential operation of the receiving device. Thus a requirement of the system is to deliver the message within the required time frame, if possible, but if this is not possible, to provide that circuit protection is not compromised. The result of a lost message is that more than one device may open (resulting in miscoordination). It is desirable for the system in which the improved communication system is employed to incorporate a circuit reconfiguration system, such as the IntelliTEAM™ II (IT-II) system available from S&C. The IT-II system is disclosed and described in commonly-assigned United States Patent Application entitled "Method and Apparatus for Control of an Electric Power Distribution System in the Presence of Abnormalities" Ser. No. 11/102,379, filed Apr. 8, 2005, the disclosure of which is hereby expressly incorporated herein by reference. Although a circuit reconfiguration system is not a required component of the system 100, the system 100 may utilize the organization of teams 114 and switches 106/108 provided by a system such as the IT-II system, and can benefit from its ability to restore service to isolated segments 114 when it can be determined that the segment 114 is not faulted. That is, in the situation identified above, where a fault flows through a segment 114: T4 to an adjacent segment 114:T3, and if multiple switches 106: X1, X2 and X5 open because the signaling message was lost, the circuit reconfiguration system would determine that the segment 114: T3 was not faulted and restore service from the normal source 102: S2. Even if the signaling message is delayed enroute to its destination, as long as the receiving device has not yet operated to isolate the fault, proper coordination may still be achieved as long as the load-side device operates first.

An additional feature of the system 100 may be that once the initial signaling message is received by any device, a second signaling message is sent to the respective source-side device(s) potentially causing the receiving device to switch to an even further delayed response curve, thus providing two levels of backup should the closest device fail to clear the fault.

Figure 2A:
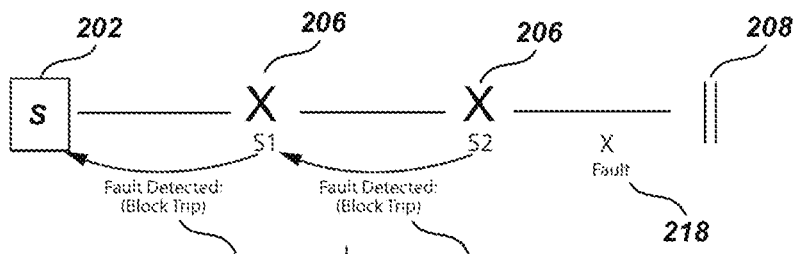
FIGS. 2a and 2b are schematic representations of a power distribution system that illustrate a communication based fault protection scheme in accordance with a herein described embodiment of the invention.

Numerous communication coordinated protection schemes are possible and several are illustrated in connection with FIGS. 2a/2b, 3a/3b and 4a/4b. FIGS. 2a/2b, 3a/3b and 4a/4b illustrate a simplified distribution system 200 in various faulted states. For purposes of illustrating operation a communication enabled coordinated protection scheme, the system 200 includes a single segmented distribution line or feeder 204 having segments 204a, 204b and 204c coupling a source 202 to various loads (not depicted) via protection devices 206, e.g., closed switches/fault interrupters 206: S1 and S2. The distribution line 204 ends at an open switch 208. The open switch may provide coupling of the distribution line 204 to an alternate source.

Figure 2B:
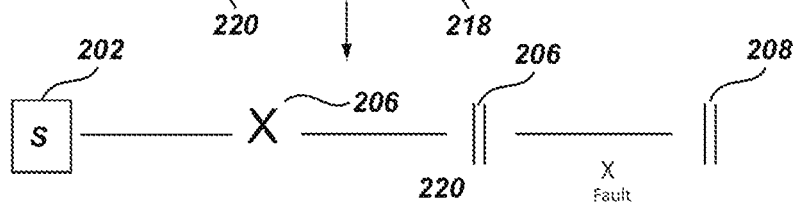

Referring to FIG. 2a, the two fault protection devices, switches 206: S1 and S2 are in series with a fault 218 in the third segment 204c. The fault 218 appears at the end of the distribution line 204 and is detected at the source 202 and at the two normally closed switches 206: S1 and S2. As soon as line conditions as a result of the fault satisfy the protection criteria of the switches 206: S1 and S2, but prior to operation of the switches to isolate the fault, each substantially simultaneously inform their nearest neighbors on their source-sides by transmitting messages 220. The messages 220 inform the source-side device to delay operation for a predetermined period of time and are configured and sent to arrive within a predefined time period, for example, about 100 milliseconds. In response to the message, the source 202 and the switch 206: S1, delay their respective operations for isolating the fault. At the switch 206: S2, however, the protective device operates immediately upon detecting the fault, i.e., the switch opens (FIG. 2b) isolating the fault. This is because the switch 206: S2 is the last closed switch on the distribution line 204. It need not delay to coordinate with downstream devices. The switch 206:S2 may further, but need not inform the normally open tie switch 208 of the fault because the normally open switch will not close until it verifies that switch 206: S2 did not see fault current prior to loss of voltage (LOV). Closing of switches 206/208 to restore the load is a circuit reconfiguration/recovery system operation subject to the auto-restoration capacity control algorithms of the circuit reconfiguration/recovery system.

In one possible implementation, the source-side device, e.g., the source 202 and/or the switch 206: S1 is informed of the fault 218 by the switch 206: S2 as soon as conditions, e.g., high current above a minimum trip setting, are detected, subject to some simple filtering to identify transient anomalies. Another possible implementation is for the switch 206: S2 to delay the reporting for a period of time proportionate to the magnitude of the fault, relative to the minimum trip setting. This arrangement reduces communication overhead by reducing the number of transmitted delay messages and provides greater assurance that the abnormal conduction, e.g., high current was not transient.

The sequence as described above isolates the fault to the nearest adjacent protection device. A reclosing process may then be implemented to determine the persistence of the fault, and once the fault no longer exists to restore service. With increasing communication bandwidth, the amount of verification that can be performed in a timely manner may increase, thus enhancing the capability of the herein described protection/restoration systems.

Figure 3A:
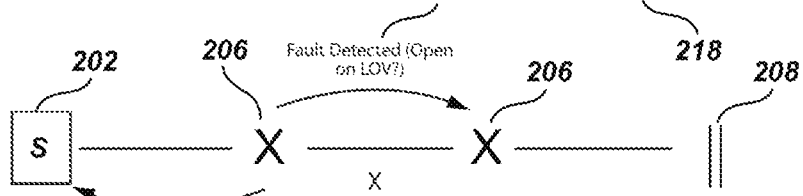
FIGS. 3a and 3b are schematic representations of a power distribution system that illustrate a communication based fault protection scheme in accordance with a herein described embodiment of the invention.
Figure 3B:
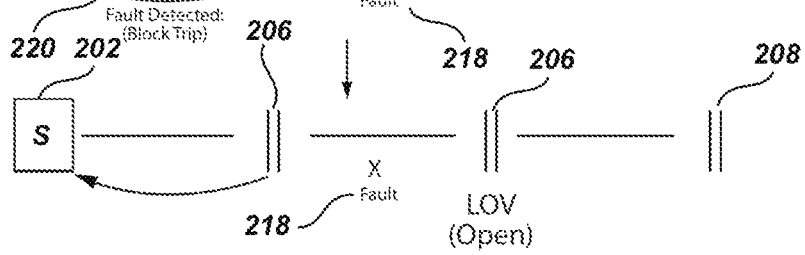

FIG. 3a illustrates a fault in the middle segment 204b. The devices operate in a manner similar to as explained in connection with FIG. 2a, except that the load-side switch 206: S2 does not see the fault and does not send a delay message. However, it may still be configured to participate in the fault isolation and restoration sequence as will be explained. Upon detecting the fault, the switch 206:S1 reports to both of its nearest neighbors that a fault has been detected. Communication by the switch 206:S1 to the source-side allows the source side devices, e.g., source 202, to delay, as described, to provide coordinated fault isolation. Following a predetermined period of time, and absent receiving a delay message from the switch 206:S2 indicating the fault is not adjacent the switch 206:S1, the switch 206:S1 operates to isolate the fault (FIG. 3b).

Communication to the load-side switch 206:S2 by the switch 206:S1 allows the switch 206:S2 to prepare to open if it observes LOV without the presence of fault current. Once the switch 206:S2 is open, the load it services can be restored from the alternate source using restoration logic and/or communication from the switch 206:S2 almost immediately upon opening via operation of the open switch 208. Alternatively, rather than beginning service restoration on the first LOV and opening of the switch 206:S2, there may be a waiting period of time to confirm that any or all source-side reclosing or reclosing attempts are completed prior to beginning service restoration via an alternate source. If the source side is restored in a short time, the switch 206:S2 could then close to restore service without having to rely on the alternate source selection. Thus, one difference between the descriptions of the scenarios of FIGS. 2a/2b and 3a/3b is that in FIG. 2a, the switch 206:S1 is sending a fault detected report only to its source-side nearest neighbor, while in FIG. 3a it is sending the report in both directions. The report to the load side may increase the speed of fault isolation and service restoration, however, at the expense of additional communication overhead.

Figure 4B:
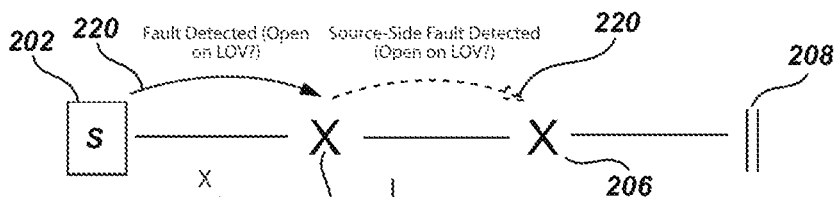
Figure 4B:
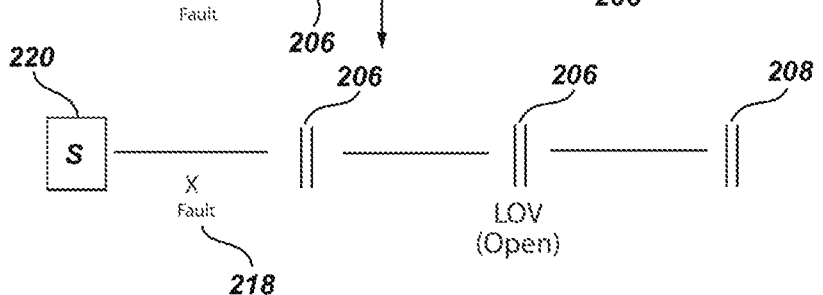

Referring to FIGS. 4a/4b, the fault 218 exists in the segment 204a, between the source 202 and the switches 206:S1 and S2, which are in series with the fault 218. Operation is similar to that in the above-described examples, except that there are now two load-side switches 206: S1 and S2 that will see the LOV upon the source 202 protection device operating. Therefore, the switch 206:S1 now reports LOV without fault to the switch 206:S2. This happens after the fault has been detected but not until the switch 206:S1 has been informed by the source 202 that there is a fault on the switch 206:S1's source side. There are many possible messaging and reconfiguration sequences that could result from this circumstance. Each one could be tailored to minimize restoration time and the number of switching operations to reduce communication dependency.

The fault protection schemes described in connection with FIGS. 2a/2b, 3a/3b and 4a/4b are without regard to the possibility that the communication system may be slow to operate or may be unreliable due to communication interference or other factors. During normal operation, each device, e.g., source 202 and switches 206/208 may periodically "ping" its neighbors to verify communication response time. If response time is not consistently within a predetermined time criterion, the protection mode of selected switches may fall back to a default scheme and/or to standalone operation.

Operation in a default or standalone scenario may result in miscoordination. From the standpoint of protection, miscoordination can occur if a protection device nearer the source satisfies its target and initiates a trip operation before the protection device closest to the fault satisfies its target. The delay messaging acts to slow the devices closer to the source to allow sufficient time for the devices nearer to the fault to operate. However, if communications are unavailable or unreliable, additional, optional precautions to reduce the chances of miscoordination can be taken. Speeding up the satisfaction of the fault target in the devices further from the substation/source will cause it generally to operate more quickly. However, for low amplitude faults, the inherent error in detection time may make this impractical. Simple calculations of available fault current based on conductor size and distance between devices could be used to assist in automating the selection of the fault settings to improve accuracy and reliability. This may not be enough in itself to reduce the possibility of miscoordination, particularly when there are a large number of protection devices in series.

An additional alternative is to delay the operation of the source-side device after satisfaction of its fault target, to allow time for the load-side device to satisfy its target and send a notification. This alternative may embody several variations.

The delay could be adjustable based on the level of current representing the fault. The lower the current, the longer the delay to wait for the load-side device target to be satisfied. The delay may also be related to the load-side device making an initial report of fault current if current is detected above a minimum trip level, even if the target has not been satisfied. The source-side device could notify the load-side device to determine if the load-side device had seen the fault. The load side device could report back, causing either an immediate operation or a delay in operation of the source-side device.

A system operator may take into account various factors in deciding when and under what conditions to permit delayed tripping, or to not. For example, for high current faults that satisfy instantaneous trip settings, such faults are commonly near to the source, and immediate operation may be permitted to prevent either source- or load-side damage. While this may well result in the operation of several fault protection devices, a circuit reconfiguration system and scheme may be employed to provide system recovery. Alternatively, the operator may wish to employ fuse saving strategies that may limit possible delay periods.

There are also various considerations in connection with specifying operation of a communication coordinated protection system for a distribution system, such as the system 100 shown in FIG. 1. A primary goal of the protection system is that source- and load-side equipment and lateral protective devices, such as fuses, are protected against damage. Without sacrificing this primary goal, coordination issues may be considered. The following discussion relies on the definition of two parameters: T the maximum fault clear time and D the maximum amount of time that a fault protection device may be delayed in operating to provide for load-side fault notification. The value "D" is the time difference between when an overcurrent operating target is reached by a fault protection device, and when the fault protection device mechanism must be engaged to clear the fault and safely avoid overcurrent damage. "D" may nominally be set at 100 ms, but may be reduced or increased based upon system-specific requirements, several of which will be described.

Figure 5:
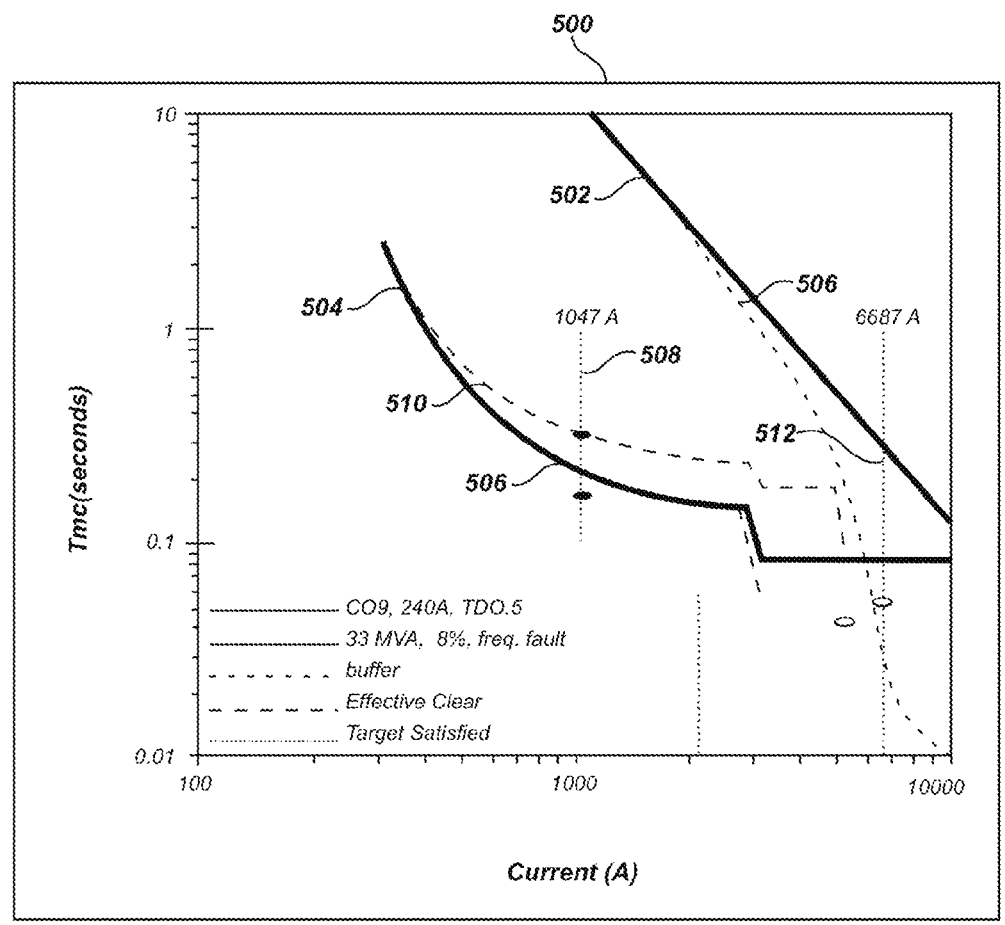
FIG. 5 is a graph illustrating fault protection characteristics of devices in a communication coordinated fault protection system.

The graph of FIG. 5 illustrates the effective protection characteristics 500 for a fault protection device. The graph depicts only the ground curve for simplicity, but the principle applies to phase and instantaneous elements as well. From the protection point of view, the ground element cannot be allowed to exceed the frequent fault damage curve 502 of the upstream transformer. The ground curve 504 itself corresponds to a circuit breaker device with a 240 A minimum pickup, time dial (TD) of 0.5 and an instantaneous set at 3000 A. While the fault protection device settings must also address overcurrent events that impact station getaways, the damage curve for these cables is further to the right of the transformer damage curve 502. In many practical cases, therefore, the transformer curve 502 represents the effective equipment damage ceiling for the whole distribution line/feeder.

A buffer curve 506 below the transformer damage curve 502 provides a 100 ms safety buffer. The protection reaction time plus the total fault clearing time of the fault protection device is therefore not permitted to exceed this buffer.

The signal for operating the fault protection device must also account for the clearing time of the device mechanism (contact travel, etc.). For the present example, it is assumed that the time taken to clear the fault current will be 30 ms under all circumstances, although the time may vary based upon the specific fault protection device. To illustrate the use of the graph in FIG. 5, assume a fault current of just over 1000 A is flowing (vertical dotted line 508). The fault protection device monitors this current until time 'A'. In order to meet its nominal clearing time, the fault protection device would normally have to initiate operation at this point. However, initiation can be delayed because the fault protection device may know that the prevailing radio environment, which is being monitored in the background, is such that messages from a downstream device are normally reaching it within 100 ms of being sent, and by waiting a further 100 ms it will not encroach on the transformer damage curve 502.

Accordingly, the fault protection device waits 100 ms to see if any blocking signal is received from a downstream device. This 100 ms could be longer or shorter depending on customer requirements or improved technology. Note that when employing fuse-saving strategies for example, a delay of 50 ms may be required. For high current faults that pose immediate damage risks, the delay may be zero. If no blocking signal is received, the fault protection device operates and clears the fault at time 'B'.

If a fault protection device satisfies its target and receives notification that a load-side fault protection device has also seen the fault, its 100 ms delay may extended by a predetermined time, for example, 50 ms (3 cycles), to verify that the fault has been cleared by the load-side fault protection device. If at the end of this extended time period, fault current above minimum trip is still present, the fault protection device operates without further delay.

By monitoring the radio environment the fault protection device knows that miscoordination is unlikely because messages will generally arrive within the required 100 ms. If, on the other hand, its monitoring shows that radio traffic is typically exceeding the configured delay time, then on reaching time 'A' it may simply operate, clearing the fault, even though there is plenty of room to wait longer before exceeding the buffer region around the transformer damage curve.

Note that from the graph in FIG. 5, the time difference between the dashed line 510 and the dotted line 506 indicates yet another safety margin between when the fault protection device will operate and when it must operate to protect equipment. Also note that at high current levels, this margin goes to zero and is encroached. In other words, if by delaying 100 ms (or the delay time set by the user) the fault protection device response encroaches on the buffer region, then the fault protection device operates regardless of the preset delay. Note that for faults above approximately 6700 A, line 512, even the normal clearing curve falls inside the buffer zone, though it does not cross the damage curve. As a result, the fault protection device must initiate operation as soon as it satisfies its overcurrent trip target at 'C'. This preemption can be implemented by configuring a fixed threshold in terms of peak current (6700 A in this case), above which the delay is eliminated, or by configuring-in a damage curve such that the fault protection device can calculate the maximum allowable delay.

Considering the effects of communication delays and the time at which the overcurrent trip target is satisfied, the communication-dependent clearing time of the device is shown by the dashed line 510. The intrinsic clearing time of the fault protection device is still its nominal clearing curve. Since the communication-dependent curve is only meaningful if there is a device downstream, then in a system of multiple fault protection devices in series, in most instances the only fault protection device that always acts on its nominal clearing curve is the one nearest to the fault, or otherwise the last fault protection device closest to the normally-open point on a given distribution segment.

While it is possible to deploy one single curve for the whole distribution segment, there is nothing which prevents deploying as many "intrinsic" curves as can be coordinated. In fact, such curves may be employed to provide some coordination in the event of a communication breakdown.

In theory, if coordination fails either because communication fails or because the communication message does not or cannot arrive fast enough, there are at least two types of miscoordination of fault protection devices: multiple source-side fault protection devices operate, one of them being fault protection device nearest the fault on the source side; or one or more source-side fault protection devices operate, but not the fault protection device nearest the fault.

Some miscoordination is acceptable where the fault protection device nearest the fault operates, but is to be avoided where possible. In the event of such miscoordination, the circuit restoration system operates to restore service to source side loads. Other types of miscoordination where the fault protection device nearest the fault does not operate is likely due to set up error, and should be addressed accordingly.

In a segment with multiple branches, the notification rules are similar except that while more than one fault protection device is capable of sending the initial "fault detected" message, in practice only one fault protection device will send the message because the fault, if on the load side of the fault protection device, will only be in a single branch. Moreover, the message will propagate to a predefined, source-side fault protection device that feeds the circuit.

Once isolation of the faulted segment is achieved, temporary faults on the segment can be eliminated by reclosing at fault protection device nearest to the fault. Alternatively, "fault pinging" can be used to determine if the fault is temporary, avoiding subjecting the segment's load to additional interruptions.

In essence and appreciated from the foregoing discussion, the herein described protection coordination systems and methods utilize nearest-neighbor communications to provide coordination of virtually an unlimited number of fault protection devices. The protection coordination systems and methods do not rely solely upon traditional coordination techniques, such as time-overcurrent coordination that is typically limited to coordinating two or three devices. In the described systems and methods, the transmission of an initial signaling message in the direction opposite of current flow, substantially simultaneously from each circuit abnormality detecting load-side device to the source-side device within each respective segment, allows only the closest, source-side device to operate. Optionally, the transmission of a signaling message from the source-side to the load-side may allow the load-side devices to prepare for operation on LOV and to provide for faster system recovery.

Referring again to FIG. 1, from the standpoint of the design of the communication system, within any given team 114 of switches 106/108, at most, only one device 106 will be sending an initial signaling message to its source-side team member device 106, and within any given feeder, the total number of messages requiring simultaneous, or near simultaneous delivery would correspond to the total number of teams 114 between the substation or source of supply 102 and the fault 118. Additionally, since protection sequences are infrequent, the communication system need only accommodate one of these protection sequences in progress at any one time. In the rare event that multiple feeders or branches of feeders experienced faults simultaneously, the only impact might be that some messages experienced delayed delivery.

Still, the messages should contain no more than a predetermined amount (nominally 300 bytes) of application data, since very long or unconstrained messages might prevent the signaling messages from gaining access to the communication media.

In addition, the signaling message may be constrained to as short a message as possible to shorten its delivery time. In one or more of the herein described embodiments, a 50 byte message size limitation may be employed.

In the system 100, to deliver the required communication latency, messages may be configured to convey a processing priority so that background or lower priority traffic imparts minimal interference to the signaling or related reconfiguration traffic. For the example application that may be implemented within the system 100, the following priorities may be assigned:

Fault Signaling Message (Priority 1)

This is the highest priority message traffic.

Fault Test Message (Priority 2)

Similar to the fault detection message. These messages are periodically sent to test the performance of the messaging path as discussed below.

Reconfiguration Message (Priority 3)

These messages are used to restore service to de-energized but unfaulted segments 114 of the system 100 in accordance with a circuit reconfiguration system. In the present system, when circuit reconfiguration system-driven restoration is in progress, the associated communication traffic is sent with this priority.

Background Traffic (Priority 4)

Less critical applications and, for example, SCADA traffic which is constantly being passed on the network, as will system and radio maintenance use this low priority.

Of course, fewer or additional priority levels may be employed, or the content or purpose of any particular priority message may be modified. Exemplary characteristics of messages in accordance with each of the specified priorities are set forth in Table 1.

TABLE 1

Traffic Summary

| Parameter | Fault Signaling message | Fault Test message | Reconfig. traffic | Background traffic |
|---|---|---|---|---|
| Priority | 1—High | 2—Medium High | 3—Medium Low | 4—Low |
| Application Maximum Message Length | 50 bytes | 50 bytes | Up to 300 bytes. | Up to 300 bytes |
| Maximum Desired Latency | 99% of messages delivered from one team member to another (through up to 2 inter-mediate hops) in less than 94 msecs. A maximum of 10 devices may be sending these messages during an event. | 99% of messages delivered from one team member to another (through up to 2 inter-mediate hops) in less than 94 msecs. | Not specified | Not specified |
| Message frequency | Infrequent, non-deterministic | Infrequent, deterministic | Only during restoration/ reconfiguration | Most frequent. Includes SCADA traffic, system maintenance, and radio maintenance. |
| Source/Destination constraints | Within a segment. But multiple segments communicating simultaneously (within 5 ms) | Within a segment. Typically one segment communicating at a time. | Mostly within a segment. | Unconstrained. |

Of course the characteristics of any particular message type, such as length, latency, frequency and source/destination characteristics may be changed or tailored to the specific application and available communication resources.

With the system 100, the implemented communication architecture must be adept at handling the prioritized traffic, and in particular, the Priority 1 traffic. In that regard, the system 100 may implement a communication architecture based on the 7-Layer, Open System Interconnect (OSI) model of communications. As is known, systems architected around this model can be built from software and hardware modules, where each module encapsulates the functionality of a given layer of the protocol stack. In addition, protocol frames sent on the physical communication media and constructed in conformance with the model are encapsulated such that communication protocol data associated with each higher layer of the protocol stack is wrapped or surrounded on one or both sides by the protocol data of the next lower layer of the model. To meet application requirements of the system 100 and to accommodate the prioritized communication traffic, a number of features of the radio and associated communication system specified by the OSI model are modified in unconventional ways.

The radio/communication system implements an "Adult Swim" feature. This feature provides that receipt of an elevated, or non-default (non-priority 4) message has an immediate effect on the prioritization and queuing for transmission of traffic at appropriate layers, e.g., at layers 2-3 of the OSI model. The effect is to impart a minimum, predetermined delay before any traffic at any lower priority can be sent, as well as to place the incoming message in the appropriate queue for processing or retransmission. The priority is specified in a priority field of a first layer, e.g., layer 3, but is intercepted and acted on immediately when encountered during lower layer processing, e.g., layer 2 link layer processing. The radio/communication system may additionally implement a process that upon receipt of a non-default priority message to process the message with the same effect as the Adult Swim feature without regard to the link layer (layer 2) or network layer (layer 3) address (broadcast, multi-cast or device-specific) of the protocol frame. The radio/communication system may further include a protocol for handling link layer media access contention resolution that is selected based upon the active priority. And, the radio communication system may implement a protocol for handling the highest two priorities of traffic that is adapted to reduce worst case latency based upon the message size and BAUD rate.

Figure 6:
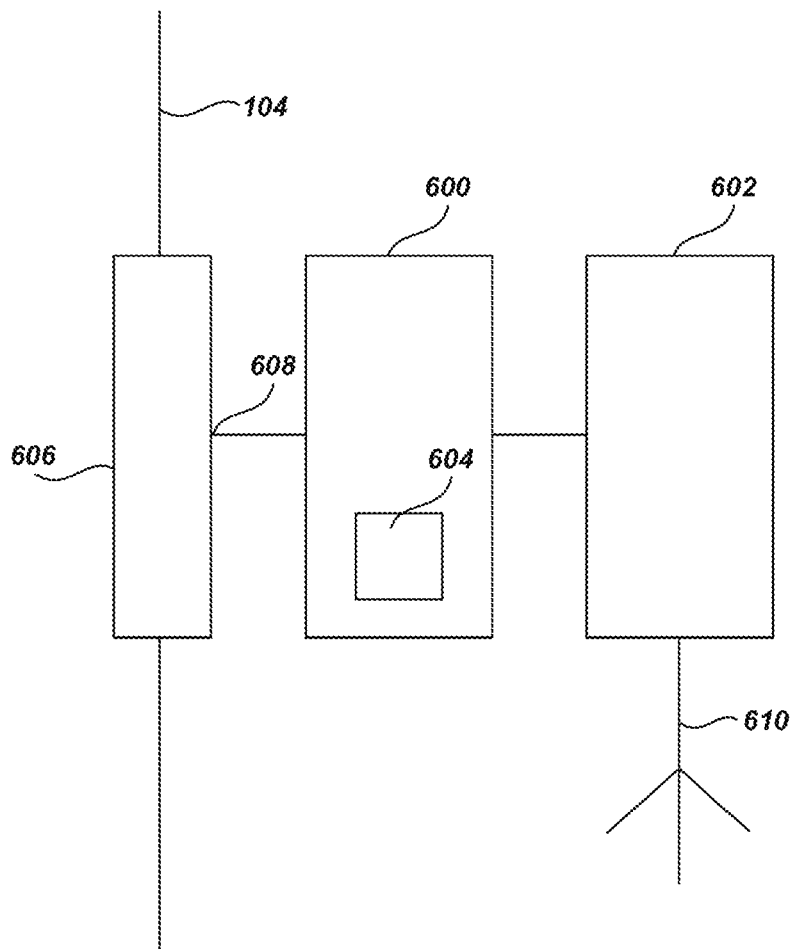
FIG. 6 is a block diagram of communication coordinated fault protection device that may be used in the power distribution grid illustrated in FIG. 1.

FIG. 6 illustrates a fault protection device 600, for example, a switch 106/108. The fault protection device 600 may include a control 604 the couples to a circuit interrupting or switching device 606, such as a vacuum fault interrupter. The control 604 may include internal memory or may couple to memory (not depicted) within which a control program and operating parameters used by the control 604 to affect operation of the fault protection device 600. The fault protection device may further include a power supply, which may be provided by an external source, a storage source, a distribution line tap, or any other suitable power source, (not depicted).

The fault protection device 600 couples to an associated communication device 602 incorporating a communication architecture consistent with the herein described embodiments. Alternatively, the communication device 602 may be incorporated within the fault protection 600. One possible communication device 602 is a software-modified version of the Nova Engineering Inc. NovaRoam EH900 900 MHz Frequency Hopping Spread Spectrum Radio. The communication device 602 may connect to the control 604 via a 10/100 MBS Ethernet connection 608, and seamlessly creates what appears to the control 604 to be an Internet Protocol (IP) wide area network. The communication device 602 may provide layers 1-3 of the OSI-compliant TCP/IP communication protocol stack, and may allow messages to be intelligently routed using the AODV ad hoc routing protocol, RFC 3561.

Operating in accordance with the OSI architecture, to send a message to another device, the control 604 creates an application message and presents it to the communication device 602 in the form of an IP network layer data frame, or "IP datagram" which is sent to the communication device 602 via the link 608. The corresponding physical and link layers of the communication device 602 receive the message, validate it for consistency with the requirements of each respective protocol layer, and puts it in a queue of messages for further processing. It will be appreciated that there may be various implementation-dependent queues and processing steps necessary before a message can be passed from layer to layer.

Message exchange, i.e., communication, between the communication device 602 and communication devices associated with other devices with the system 100 is accomplished by transferring the messages through the layers to the physical layer consisting of a suitable RF media 610.

In accordance with the herein described embodiments, and to implement the prioritized communication architecture of the system 100, the communication device 602 is operable to recognize when elevated or non-default priority messages are being sent to enter a priority communication state. In response to the priority communication state, the communication device 602 suspends lower-priority competing traffic, traffic that is of a lower priority than the present priority communication state, for a predetermined period of time. Suspending the lower-priority competing traffic reduces contention and allows the prioritized traffic to reach its destination more quickly. The communication device 602 may queue lower priority traffic that might be present in the system 100 prior to the event, generating the higher priority traffic. Lower priority traffic may continue to be injected into the stream by devices within the system 100 that do not overhear the prioritized traffic on the airwaves, or by control devices or other sources of traffic (such as a SCADA system or other applications) that are unaware of the occurrence of an event initiating higher-priority traffic. The communication device 602 may implement a suitable queuing of such traffic or may simply discard the lower-priority traffic, and, for example, the generating application may be expected to retry the communication at a later time.

The communication device 602 may implement a number of timers, each timer corresponding to a message priority level above a lowest (default) message priority level. For example, the communication device 602 may implement three timers, each timer being dedicated to one of the three elevated (non-default) message priorities. Each timer is initialized or reinitialized to a respective predetermined, configurable value whenever a message at the respective priority, or higher priority, is received. While the timer is active, all communication traffic at a lower priority level is suspended, for example, by holding the lower priority level traffic in its respective processing queue but not otherwise processing the traffic. Each timer automatically decrements to zero and when it expires, lower priority traffic or default priority traffic processing is resumed.

From the standpoint of applications sending or receiving messages, the TOS (Type of Service) byte in the IP datagram is used to convey the application priority between the application and the communication system. Upon receipt of a non-default priority message from the application via the Radio's Ethernet port, the Radio prioritizes the message in its Layer 3, IP processing queue. When the highest priority Layer 3 message is sent to the Radio's link layer, its message priority is also conveyed. All Layer 2 messages sent out over the radio's RF communication channel contain the presently active (top) priority as a MAC layer message field.

Figure 7:
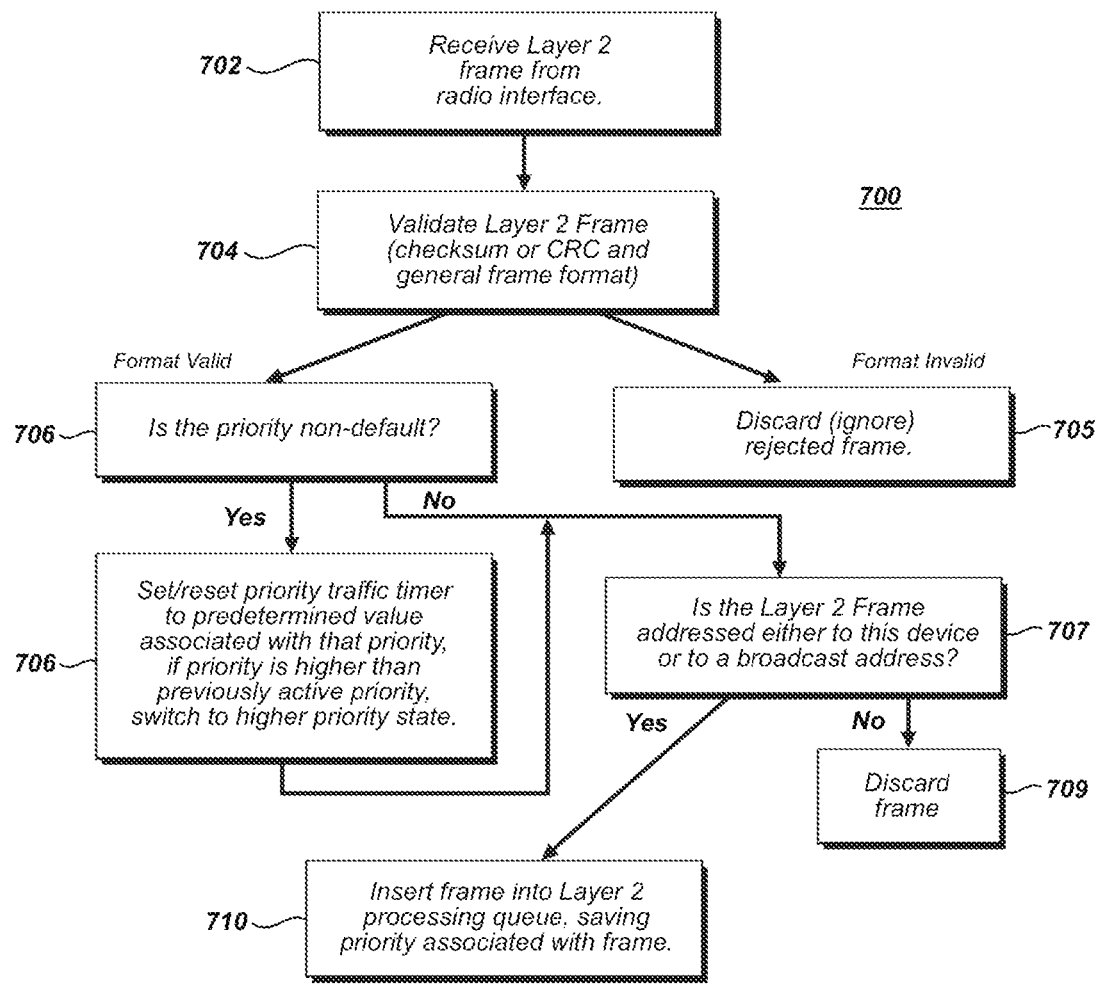
FIG. 7 is a flowchart illustrating a method of determining message priority.

The flowchart shown in FIG. 7 illustrates a message processing method 700 that may be implemented by the communication device 602 to implement the Layer 2 processing. At block 702, a frame is received over the air via the radio interface 210. At block 704, the frame is checked for integrity in accordance with the specified OSI layer protocol, e.g., layer 2, and rejected, block 705, if it is invalid. This check occurs before the destination address is inspected. At block 706, the frame's priority, is advantageously processed whether or not the message is addressed to the receiving communication device. Inspecting message priority at this early stage eliminates the need for additional messaging to inform other radios that a high (non-default) priority message is in the system. Note that this frame could contain a message (IP Datagram) or it could contain a message acknowledgement. Since all link layer traffic contains the active priority, other radios hearing the acknowledgement but not the original message being acknowledged will also transition into the prioritized messaging state. Thus these other radios will also suspend lower priority messaging to avoid possible contention from "partially hidden nodes". At the block 706 the payload is inspected to determine if the frame has a non-default priority. Note that this processing could be considered to be a departure from the typical processing of protocols since the priority field will be processed without regard to whether or not the frame is addressed to the present device. If there exists in the frame a non-default priority, i.e., elevated priority, at block 708 the processing prioritization timer associated with the detected priority level, and the timers for all lower priority levels are set/reset to their predetermined values. At block 707, after the prioritization has been inspected, the message is placed in the appropriate queue, block 710, or discarded, block 709. When placed in the appropriate queue, the priority information associated with the frame is preserved.

Figure 8:
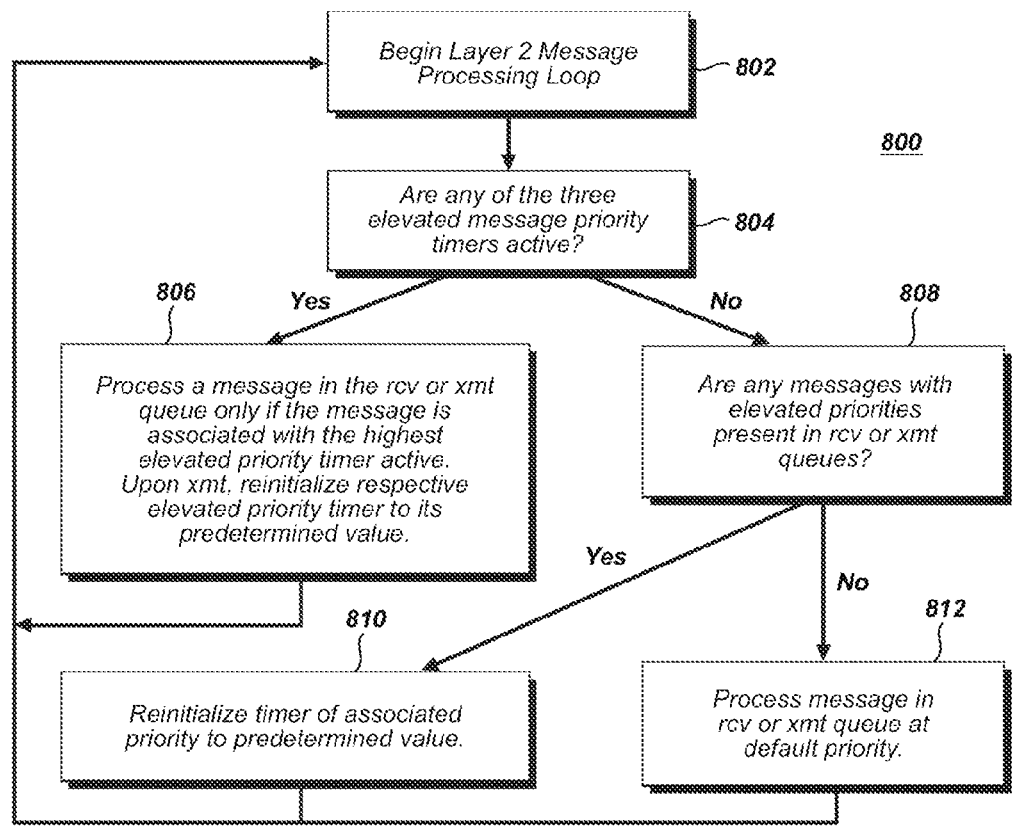
FIG. 8 is a flowchart illustrating a method of message processing responsive to determination of message priority.

The flowchart shown in FIG. 8 illustrates a message processing method 800 in response to the presence of priority information. At block 802 the initial frame processing layer, e.g., layer 2, operates to inspect its operating environment for processing to be performed. This processing loop is essentially continuous. Whenever processing resources are available the layer services its queues. At block 804, if any elevated priority timers are active, block 806 is invoked to process only messages associated with the highest active priority.

It is possible for all of the priority timers to expire with elevated priority messages remaining in a queue. This could happen, for example, if a priority 3 message was received, followed by a long stream of priority 1 messages. Thus at block 808 this condition is checked for and the expired timer is reestablished (reinitialized) at block 810. Note that if a timer is active and no traffic at that priority is present in the receive or transmit queues, the communication device will be silent on the network. Thus the network will be less subject to competing traffic at a lower priority. Upon the expiration of all priority timers, processing of lower or default priority messages resumes at block 812.

Additional layer processes, e.g., layer 3 processes, uses the same methodology with some possible exceptions. For example, upper layers may have unique queues, but the priority timers are shared with the lower layers. Processing at an upper layer may therefore result in the timers being set/reset using the same logic as shown in FIG. 7. Similarly, for Layer 3 IP frames presented by the application to the radio, the IP TOS field containing the priority information is inspected upon receipt by the Layer 3 processing in the radio. If the priority is non-default, the priority information is passed immediately as a notification to the Layer 2 processing, causing the Layer 2 timers to be updated according to the logic of block 708.

It should be noted that as with other message prioritization schemes, message prioritization does not guarantee delivery within any fixed time period. The prioritization serves to improve the likelihood of message receipt within the desired time frame. The application should be designed to be tolerant of these imperfections.

As described above, the system 100 may implement a process for providing coordinated operation of various circuit protection/fault isolation devices implemented within the system 100. Coordination of the circuit protection/fault isolation devices may be provided using wireless communication technology, wherein a prioritization system is implemented to enhance the reliability of high priority messages associated with the occurrence of a fault. The prioritization scheme may provide for suspension of communications by devices receiving a message containing a priority indication, whether or not that message was addressed to that particular device. In this manner, all devices receiving a priority indication may act to limit traffic within the radio system to address latency issues associated with communicating priority messages.

In order to allow numerous network nodes with only five groups, the group assignments must be reused. In most instances, nodes will only be within range of their immediate neighbors allowing for frequent reuse of time slot groups. In some cases, however, a node may have strong links to its immediate neighbors, and weak links to distant neighbors. A collision detection and contention resolution process may be employed. This process may look to signal strength of messages arriving in a time slot grouping to reject weak signals and to develop a high probability of correlating on the correct, neighbor transmitter signal. In most instances, the weak signal will be rejected simply because the stronger signal will correlate first. This probability is further increased by maintaining network timing accuracy to less than the duration of the carrier and unique word of the time slot, which can be accomplished by extending the total length of the preamble, carrier and unique word.

Thus, the system 100 may implement a communication protocol defining a first, limited access channel access mechanism that is employed for high priority traffic and a second general access channel access mechanism for low priority traffic. For example, for high priority traffic, a channel assignment scheme as provided by a TDMA protocol reduces the number of simultaneously communicating nodes and assigns nodes to communicate within a specified time slot to guarantee one or more contention free periods to transmit reducing and/or eliminating contention issues that could add to latency. For low priority traffic, the nodes may utilize a general, contention access protocol such as CSMA/CA when latency requirements are less rigorous. Each of the limited access channel access mechanism and the general access channel mechanism further advantageously allow each node to communicate within a single radio channel reducing hardware and maintenance complexity.

While the invention is described in terms of several preferred embodiments of power distribution protection and recovery systems and corresponding methods, it will be appreciated that the invention is not limited to such systems and methods. The inventive concepts may be employed in connection with any number of systems, devices and methods for providing coordinated distribution system protection.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

We claim:

1. A power distribution protection system comprising:
a source coupled to a load by a distribution line, the distribution line being segmented by a plurality of fault protection devices;
each of the plurality of fault protection devices including a communication device permitting transmission or reception of a signaling message and each of the plurality of fault protection devices being operable to determine the existence of a fault condition of the distribution line, wherein
upon detection of the fault condition of the distribution line, each of the plurality of fault protection devices detecting the fault condition communicate the signaling message to an adjacent source or one of the plurality of fault protection devices, and each of the plurality of fault protection devices receiving a signaling message is operable to adjust a fault protection characteristic such that fault protection devices of the plurality of fault protection devices nearest to the fault on the distribution line operates to isolate the fault from the remainder of the distribution line.

2. The power distribution protection system of claim 1, wherein each of the plurality of fault protection devices receiving the signaling message is operable to communicate a second signaling message to an adjacent fault protection device, and each of the plurality of fault protection devices receiving the second signaling message is operable to further adjust the fault protection characteristic such that the one of the plurality of fault protection devices nearest to the fault on the distribution line operates to isolate the fault from the reminder of the distribution line.

3. The power distribution protection system of claim 1, wherein the signaling message contains a priority indicator, and each of the plurality of fault protection devices receiving the signaling message is operable to enter a priority communication state corresponding to the priority indication.

4. The power distribution protection system of claim 3, wherein in accordance with the priority communication state each of the plurality of fault protection devices is operable to suspend communication of messages that do not correspond to the priority state.

5. The power distribution protection system of claim 3, wherein the initial signaling message precedes further communications corresponding to the priority state.

6. The power distribution protection system of claim 3, wherein each of the plurality of fault protection devices is operable to receive the signaling message from another, non-adjacent one of the plurality of fault protection devices, and upon receiving the signaling message from the another, non-adjacent one of the plurality of fault protection devices to enter the priority communication state.

7. The power distribution protection system of claim 3, the communication device of each of the plurality of fault protection devices complying with a communication architecture including at least a physical layer, a link layer and a network layer, wherein the priority indication is contained within one of the physical layer, the link layer or the network layer.

8. The power distribution protection system of claim 7, wherein the priority indication is contained in the physical layer.

9. The power distribution protection system of claim 7, wherein the priority indication is contained in the link layer.

10. The power distribution protection system of claim 7, wherein the priority indication is contained in the network layer.

11. The power distribution protection system of claim 3, wherein each of the plurality of fault protection devices is operable to discard messages that do not correspond to the priority communication state.

12. The power distribution protection system of claim 3, the communication device comprising a timer associated with the priority indication to record a duration of the priority communication state.

13. The power distribution protection system of claim 1, wherein fault protection characteristic comprises a first time to operate value and a second time to operate value, different from the first time to operate value, wherein each of the plurality of fault protection devices are operable to select the second time to operate value in response to receipt of the signaling message.

14. The power distribution protection system of claim 13, wherein the second time to operate value is a delayed time to operate value relative to the first time to operate value.

15. The power distribution protection system of claim 1, wherein the adjacent one of the plurality of fault protection devices comprises a source-side device.

16. The power distribution protection system of claim 1, wherein the adjacent one of the plurality of fault protection devices comprises a load-side device.

17. The power distribution protection system of claim 16, wherein the signaling message comprises a loss of voltage without fault indication.

18. The power distribution protection system of claim 17, wherein the adjacent one of the plurality of fault protection devices operates in response to the signaling message and a loss of voltage indication.

19. The power distribution protection system of claim 1, wherein the plurality of fault protection devices are grouped into groups including a source-side fault protection device and a load-side fault protection device bounding a continuous portion of the distribution line.

20. The power distribution protection system of claim 1, wherein each of the plurality of fault protection devices comprise a fault protection device selected from the group of fault protection devices consisting of: a switch, a fault interrupter, a sectionalizer, a circuit breaker and a recloser.

21. The power distribution protection system of claim 1, the fault protection characteristic comprising a fault magnitude operating parameter.

22. The power distribution protection system of claim 21, the fault magnitude operating parameter including a fault magnitude dependent delay value.

23. The power distribution protection system of claim 22, wherein the delay value is a delay time period associated with device operation prior to receiving a signaling message.

24. The power distribution protection system of claim 1 comprising a shared communication channel for use by each communication device, the signaling message being transmitted or received within the shared communication channel, the shared communication channel being specified in accordance with a first channel access protocol for messages having a first priority and a second channel access protocol for messages having a second priority.

25. The power distribution protection system of claim 24, the first channel access protocol comprising a limited access communication protocol.

26. The power distribution protection system of claim 24, the second channel access protocol comprising a general access, collision detection communication protocol.

27. The power distribution protection system of claim 24, the signaling message containing a priority indication corresponding to either the first priority or the second priority.

* * * * *